(12) United States Patent
Nanbu

(10) Patent No.: US 6,755,439 B2
(45) Date of Patent: Jun. 29, 2004

(54) INFLATOR

(75) Inventor: Yuichi Nanbu, Shiga (JP)

(73) Assignee: Takata Corporation, Tokyo (JP)

( * ) Notice: Subject to any disclaimer, the term of this patent is extended or adjusted under 35 U.S.C. 154(b) by 16 days.

(21) Appl. No.: 10/063,938

(22) Filed: May 28, 2002

(65) Prior Publication Data

US 2002/0180195 A1 Dec. 5, 2002

(30) Foreign Application Priority Data

May 29, 2001 (JP) .................................. 2001-160257

(51) Int. Cl.$^7$ .............................................. B60R 21/26
(52) U.S. Cl. ...................................................... 280/737
(58) Field of Search ................................ 280/737, 741; 137/68.13, 68.3, 68.29

(56) References Cited

U.S. PATENT DOCUMENTS

| 5,242,194 | A | | 9/1993 | Popek | |
|---|---|---|---|---|---|
| 5,273,312 | A | | 12/1993 | Coultas et al. | |
| 5,351,988 | A | * | 10/1994 | Bishop et al. | 280/737 |
| 5,588,676 | A | * | 12/1996 | Clark et al. | 280/741 |
| 5,601,309 | A | * | 2/1997 | Bender et al. | 280/737 |
| 5,649,720 | A | * | 7/1997 | Rink et al. | 280/737 |
| 5,653,463 | A | * | 8/1997 | Jeong | 280/737 |
| 5,690,357 | A | * | 11/1997 | Cuevas | 280/737 |
| 5,709,406 | A | * | 1/1998 | Buchanan | 280/737 |
| 6,062,599 | A | * | 5/2000 | Forbes et al. | 280/737 |
| 6,295,935 | B1 | * | 10/2001 | Swann et al. | 102/530 |
| 6,412,811 | B1 | * | 7/2002 | Campbell et al. | 280/730.2 |

FOREIGN PATENT DOCUMENTS

| JP | 05-201304 | | 8/1993 |
|---|---|---|---|
| JP | 09-058394 | A | 3/1997 |
| JP | 10-138862 | | 5/1998 |
| JP | 10-250525 | | 9/1998 |

* cited by examiner

*Primary Examiner*—Charles T. Jordan
*Assistant Examiner*—T. Nguyen
(74) *Attorney, Agent, or Firm*—Foley & Lardner LLP

(57) ABSTRACT

An inflator including a piston which can reliably break a sealing plate. The inflator includes a piston which is two-forked at an end thereof and is provided with two cutting edges. The cutting edges come into contact with portions of a sealing plate which swells toward the piston side by being pushed by a high-pressure gas stored in a bottle. The portions being offset from the vertex of the swelling sealing plate. Each cutting edge is tapered at the outer side thereof, and the tip of the cutting edge is thereby positioned at the inner side of the periphery of the piston. The angle formed between the axis of each cutting edge and the surface of the sealing plate is increased. Deformation of the cutting edges toward the outside and slip thereof along the spherical surface can be suppressed.

10 Claims, 7 Drawing Sheets

PRIOR ART

PRIOR ART

INFLATOR

BACKGROUND

The present invention relates to an inflator for generating gas for inflating and deploying an airbag.

As a gas generator for deploying an airbag, a type (combustion type) of inflator which burns a gas-generating agent (propellants) and generates gases by chemical reaction, and another type (stored-gas type) of inflator which ejects a high-pressure gas stored in a container are known.

A stored-gas-type inflator is shown in FIG. 5. FIG. 5 is a schematic longitudinal-sectional view of a known stored-gas-type inflator which is disclosed in, for example, Japanese Unexamined Patent Application Publication No. 10-250525 (incorporated by reference herein).

The inflator 100 includes a bottle 101 to be charged with a high-pressure gas. A sleeve 109 is connected at an opening 103 of the bottle 101 via a ring 106. The ring 106 is provided with an aperture 106a formed at a central part of the ring 106.

A burst disk or sealing plate 107 is mounted by welding or similar methods to the sleeve 109 side of the ring 106 (i.e., the left side of the ring 106 as shown in FIG. 5). The burst disk 107 is made of steel and has a thickness of approximately 0.3 mm. As shown in FIG. 5, the burst disk 107 bows toward the sleeve 109 side due to the pressure of the gas stored in the bottle 101.

A plurality of gas outlets 104 are formed in the sidewall of the sleeve 109. During operation of the inflator the high-pressure gas in the bottle 101 is ejected through the outlets 104. A housing 110 mates with the sleeve 109 at an end (the left side open end in FIG. 5). The housing 110 includes an initiator fixing or retaining part 110a and a cylinder 110b protruding from the fixing part 110a. The fixing part 110a is affixed and held by the sleeve 109 at the end thereof. An initiator 112 is embedded in the fixing part 110a. An end (right side end) 112a of the initiator 112 extends into the cylinder 110b.

A piston 115 is disposed in the cylinder 110b of the housing 110. An end 115a of the piston 115 is tapered in a cone-shape. The piston 115 is provided with a hole 115b formed in the rear end of the piston 115. The end 112a of the initiator 112 is inserted into the hole 115b. The burst disk 107 is disposed at a predetermined distance from an end 110c of the cylinder 110b of the housing 110.

The gas outlets 104 of the inflator 100 communicate with an airbag body (not shown). In a normal state, a gas fills the bottle 101 and is sealed in the bottle 101 with the burst disk 107. When the automobile receives an impact, a sensor (not shown) operates and the initiator 112 generates a gas blast. The gas blast moves the piston 115 away from the housing toward the burst disk (i.e., to the right of FIG. 5).

The end 115a of the piston 115 breaks the burst disk 107 at a central part. The high-pressure gas filling the bottle 101 is ejected and is supplied into the airbag body from the inside of the sleeve 109 through the gas outlets 104 formed in the peripheral surface of the sleeve 109.

The end 115a of the piston 115 must be keen-edged so that the piston 115 reliably breaks the burst disk 107. In the above example, the end 115a is formed tapered in a cone-shape.

A gas generator used in an inflator or the like is disclosed in, for example, Japanese Unexamined Patent Application Publication Nos. 5-201304, 10-138862, and 12-250525 (all three incorporated by reference herein), in which the piston of the gas generator takes the shape of a cylinder, a cone, and a pyramid (polygonal), respectively.

FIG. 6 shows an end of the piston having another shape. As show in FIGS. 6(A), 6(B) and 6(C), respectively, the end of the piston may be formed as a needle, a cylinder shown, or as a punch.

As shown in FIG. 6(A), the needle 121 includes a fine pointed tip. As shown in FIG. 6(B), the cylinder 123 is provided with a circular recess formed at one end. The circular recess includes a cutting edge 125 around the periphery. As shown in FIG. 6 (C), the punch includes a cylinder 127 having a two-forked end. The forked end includes two cutting edges 129.

From among the shapes of the end of the piston discussed above, the punch-shaped two-forked end is currently thought to be the most effective shape for reliably breaking the sealing plate with the smallest force. The punch-shaped piston cuts into the burst disk at two positions located away from the vertex of the swelling burst disk. However, the two-forked punch-shaped piston has a problem described below.

FIG. 7 is a schematic view of the two-forked punch-shaped piston being deformed at an instant when the piston comes into contact with the burst disk. Although the piston is arranged so that its longitudinal axis 131 is aligned with the vertex of the burst disk swelling in a spherical shape, the tip of each cutting edge 129 is offset to the outside from the axis 131 of the piston. As a result, when the piston comes into contact with the spherically swelling burst disk, the tips of the two cutting edges 129 come into contact with the burst disk at positions remote from the vertex of the disk. The cutting edges do not contact the disk at a right angle and, instead, contact the disk at a smaller angle. As a result, the cutting edges 129 sometimes slide on the surface of the burst disk 129' and are bent toward the outside, as shown by dotted lines in FIG. 7. Therefore, the cutting edges do not sharply cut and there is a risk that the burst disk is not broken smoothly.

SUMMARY OF THE INVENTION

Accordingly, an object of the present invention is to provide an inflator that includes a piston which is capable of reliably breaking a burst disk or sealing plate with a small force.

According to one embodiment of the present invention an inflator is provided. The inflator comprises a bottle to be charged with high-pressure gas and having an opening. The inflator also includes a sealing plate for sealing the bottle at the opening and an initiator for generating a gas blast. The gas blast provides the motive force to break the sealing plate. A punch or piston that includes a cutting edge is provided for breaking the sealing plate. The punch being accelerated toward the sealing plate by the gas blast of the initiator. The sealing plate swells toward the punch by being pressed by the high-pressure gas. The cutting edge of the punch comes into contact with a portion of the sealing plate offset from the vertex of the swell of the sealing plate. The cutting edge of the punch is formed by a tapered face formed at the outer side of the cutting edge (i.e., at the side away from the vertex of the sealing plate).

Due to the tapered cutting edge of the punch, the tip of the cutting edge is positioned inside the periphery of the punch. An angle between the central line of the cutting edge and the surface of the sealing plate is increased. Therefore, the cut made by the cutting edge into the swelling sealing plate is improved, and the deformation of the cutting edge away from the vertex of the sealing plate and the slippage of the cutting edge along the spherical surface of the sealing plate are reduced. As a result, the reliability of the punch breaking the sealing plate is increased.

According to an embodiment of the present invention, the tapered face is preferably formed so as to have an angle smaller than an angle oh of friction with respect to the normal line on a contact point between the cutting edge and the sealing plate, the angle α of friction being determined in accordance with the materials of the punch and the sealing plate. The length (in the axial direction of the punch) of the tapered face is preferably set to 0.5 mm or greater. With the arrangement of the shape and the size as described above, the cutting edge can effectively and reliably break the sealing plate.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Various embodiments of the present invention are described below with reference to the drawings. In the specification, directions (such as, to the left or the right, and upper or lower) are referred to with reference to the drawings.

Figure 1:
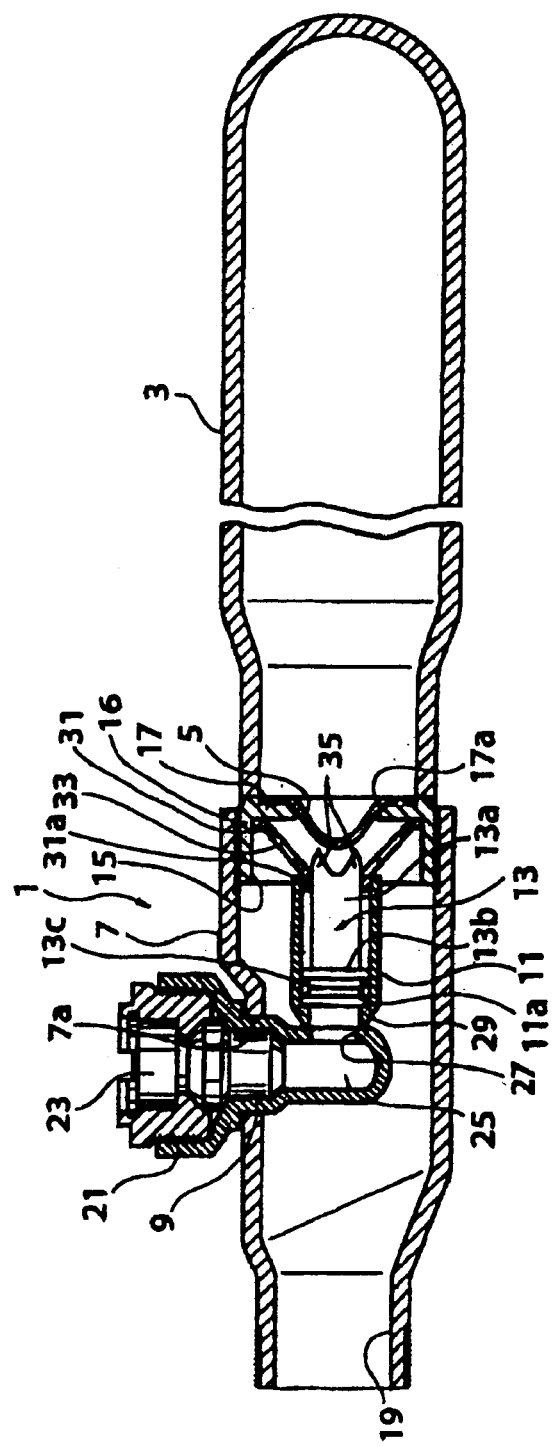
FIG. 1 is a longitudinal-sectional view of an inflator according to an embodiment of the present invention.

FIG. 1 is a longitudinal-sectional view of an inflator 1 according to an embodiment of the present invention. The inflator 1 includes a bottle 3, a sealing plate (burst disk) 5, a diffuser 7, an initiator 9, a barrel 11, and a piston (punch) 13.

The bottle 3 is preferably formed of steel and is formed as a cylinder with a bottom. The bottle 3 is charged with a high-pressure inactive gas or the like. As shown in FIG. 1, a ring-shaped annular member 16 is connected to the left end (open end) of the bottle 3. A flange 17 is formed protruding to the inside of the annular member 16 at the bottle 3 side thereof. The flange 17 forms an aperture 17a at a central part thereof. The annular member 16 is straight open at a left end 15 thereof in the drawing.

The sealing plate 5 is fixed to the right side of the flange 17 of the annular member 16 by welding or the like from the inside of the bottle 3. The sealing plate 5 is a flat disk made of, for example, steel, and has a thickness of, for example, 0.4 mm. The sealing plate 5 is planar when the bottle 3 is not charged with high-pressure gas, and bows (or swells) in a spherical shape toward the outside of the bottle 3 from the aperture 17a of the flange 17 when the bottle 3 is charged with the high-pressure gas.

The diffuser 7 is made of, for example, steel and is formed in a cylindrical shape. The diffuser includes two open ends. The end 15 of the annular member 16 is fixed to one end (the right end as shown in FIG. 1) of the diffuser 7 by screwing. The other end of the diffuser 7 (left end as shown in FIG. 1) serves as an outlet 19 of the high-pressure gas. The gas outlet 19 is connected to an airbag (not shown). A through-hole 7a is formed in the upper side of the diffuser 7. A housing 21 is inserted into and affixed at the through-hole 7a. An ignition plug 23 and the initiator 9 are mounted in the housing 21. The housing 21 is provided with a space 25 formed at a lower part of the housing 21, which extends substantially to the center of the diffuser 7. The housing is provided with a through-hole 27 in the sidewall at a lower part and at the bottle side of the housing.

The cylindrical barrel 11 is connected to the lower part of the housing at the through-hole 27 thereof. An inner hole 11a of the barrel 11 communicates with the space 25 of the housing 21. The barrel 11 extends toward the bottle 3 along the axis of the bottle 3. A step 29 is formed inside the left end of the barrel 11. The piston 13 includes a larger diameter part 13b that contacts the step 29. The inner wall of the inner hole 11a of the barrel 11 extends from the right side of the step 29 to the right end of the barrel 11, the inner hole 11a being open at the right end of the barrel 11. The barrel 11 is connected to the inner face of the flange 17 of the bottle 3 at the right end (bottle side end) of the barrel 11 by a supporting plate 31. The supporting plate 31 is formed as a frustum of a cone and is provided with a plurality of through-holes 33. The through-holes 33 serve as paths for gas from the inside of the bottle 3 to the inside of the diffuser 7 when the sealing plate 5 is broken. A left end 31a of the supporting plate 31 is inserted into the right end of the inner hole 11a of the barrel 11, thereby forming a step in the inner hole 11a.

The piston 13 is preferably formed of stainless steel or similar material and is slidingly disposed in the barrel 11. The piston 13 includes a head 13a at the right end (the bottle side end) and the larger diameter part 13b at the left end (the housing side end) of the piston 13. The head 13a has an outer diameter smaller than the inner diameter of the barrel 11 and the end of the head 13a is two-forked, as described further below. The larger diameter part 13b has an outer diameter substantially the same as the inner diameter of the barrel 11. A ring groove 13c is formed in an intermediate portion of the larger diameter part 13b. In a normal (i.e., non initiated) state the left end of the larger diameter part 13b of the piston 13 is in contact with the step 29 disposed at the rear side of the barrel 11. In the normal state, the head 13a of the piston 13 is positioned away from the sealing plate 5.

Figure 2:
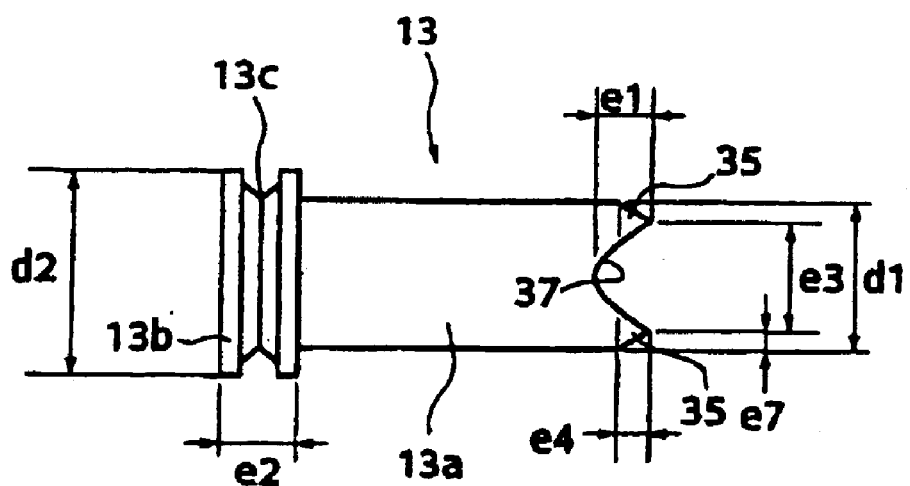
FIG. 2(A) is a side view of the entire piston of FIG. 1.
FIG. 2(B) is an expanded side view of the tip of the piston shown in FIG. 1.
Figure 2:
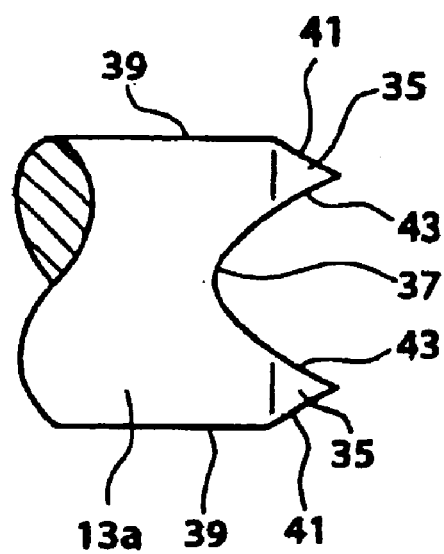

As shown in FIG. 2(A) and described above, the piston 13 includes the head 13a and the larger diameter part 13b.

According to the present embodiment of the invention, the diameter d1 of the head 13a is preferably about 8 mm. The diameter d2 of the larger diameter part 13b of piston 13 is preferably about 10 mm. The tip of the head 13a is two-forked and is provided with two cutting edges 35. The depth e1 of a bottom 37 between the two cutting edges 35 from the tip of the piston is preferably about 3 mm. The bottom 37 is formed such that the radius of a curved surface of the bottom becomes R1.5. R is the radius of a circle intersecting the tips of the two cutting edges 35 (i.e., the radius of the bowed sealing plate), as shown in FIG. 3(B). The length e2 of the larger diameter part 13b along the axis of the piston is about 4 mm.

A tapered face 41 inclined toward the inside from the peripheral surface 39 of the piston is formed at the outer side of each cutting edge 35, as shown in an expanded view in FIG. 2(B). Each cutting edge 35 is formed with the tapered face 41 and an inclined face 43 disposed at the inside. A distance e3 between the two cutting edges 35 is preferably about 6 mm. A length e4 of each cutting edge 35 (the length of the tapered face 41) in the axial direction of the piston is preferably about 1.5 mm.

Figure 3:
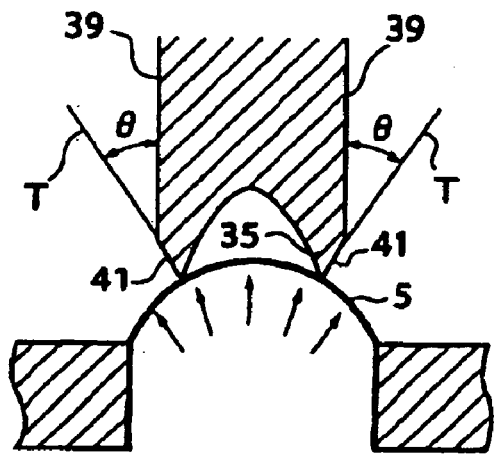
FIG. 3(A) is an illustration showing a state in which cutting edges of the piston of FIG. 1 are in contact with a sealing plate which swells in a spherical shape.
FIG. 3(B) is a closer view of the piston of FIG. 3(A) showing the relationship of angles between each part.
Figure 3:
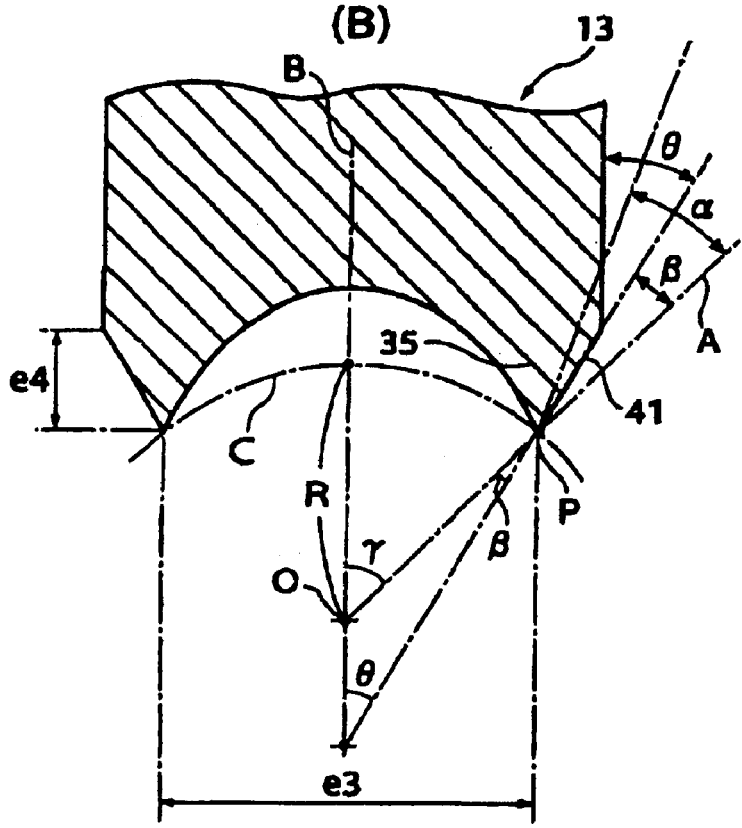

The angle of the tapered face 41 is described below. FIG. 3 includes illustrations of the cutting edges of the piston in contact with the sealing plate swelling in a spherical shape. FIG. 3(A) is one of the illustrations showing the whole. FIG. 3(B) is the other illustration showing in detail the relationship of angles between each part.

A taper angle θ shown in FIG. 3(A) is defined as an angle between the peripheral surface 39 extending in the longitudinal direction of the piston (parallel to the axis of the piston) and an elongation T of the tapered face 41.

A method for forming the tapered face 41 is described below with reference to FIG. 3(B).

An angle α of friction is obtained from a coefficient μ of friction obtained in accordance with the material of the piston 13 and the material of the sealing plate 5, in which tan α=μ. Symbol β represents an angle between the tapered face 41 and a normal line A on a contact point P between each cutting edge 35 and the sealing plate 5. The tapered face 41 is disposed at the piston 13 side of the normal line A such that the angle β between the tapered face 41 and the normal line A becomes smaller than the angle α of friction. The tapered face 41 may be disposed at the side opposite to the piston 13 with respect to the normal line A (in an opposite direction of the angle α of friction), unless the angle β becomes an obtuse angle.

When symbol γ represents an angle between a line B disposed on the axis of the piston 13 and on a center O of a spherical surface C formed with the sealing plate 5 and the normal line A disposed on the contact point P between the cutting edge and the sealing plate, the taper angle θ equals the difference between the angle γ and the angle β.

Therefore, when the angle α of friction is obtained from the materials of the piston 13 and the sealing plate 5, the angle β, which is smaller than the angle α, is determined. Then, the angle γ is obtained from the distance e3 (see FIG. 2(A)) and the radius R of the spherical surface of the sealing plate. The taper angle θ is obtained by subtracting the angle β from the angle γ.

The details may be reviewed, so that the taper angle θ satisfies the above-described condition (β<α), after the sizes shown in FIG. 2(A) are roughly set. That is, the taper angle θ can be obtained when the length e4 of the tapered face 41 in the axial direction of the piston and a length e7 (e7=(d1−e3)/2) of the tapered face 41 in the radial direction of the piston are set. The angle γ is obtainable from the distance e3 between the two cutting edges of the piston and the radius R of the spherical surface C of the sealing plate. The angle β can be obtained by subtracting the angle θ from the angle γ. Each size may be controlled so that the angle β becomes the same as or smaller than the angle θ. According to the present embodiment, the assumed friction coefficient μ=0.4, the angle α of friction=21.8°, and the taper angle=20°.

Figure 4:
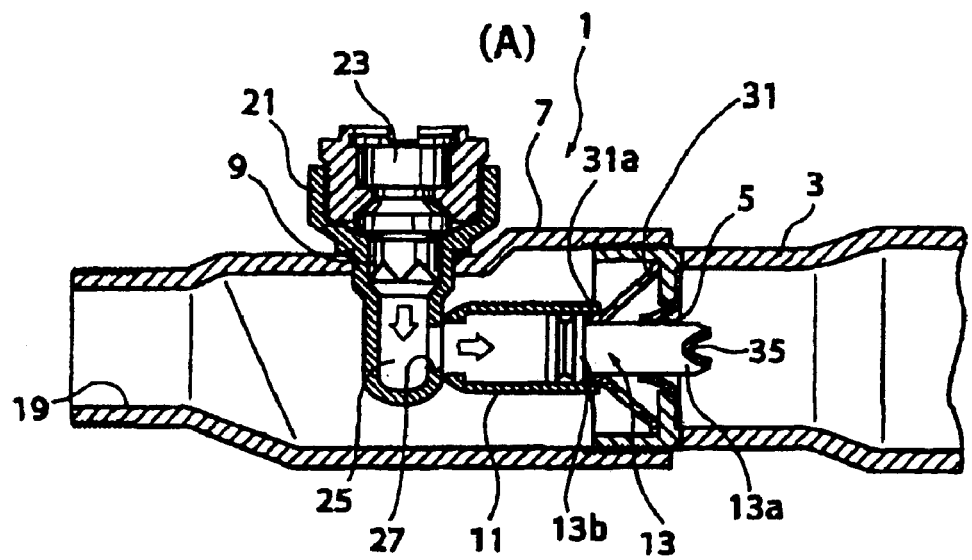
FIG. 4(A) shows the operation of the piston of FIG. 1.
FIG. 4(B) shows a state in which high-pressure gas is ejected from the bottle.
Figure 4:
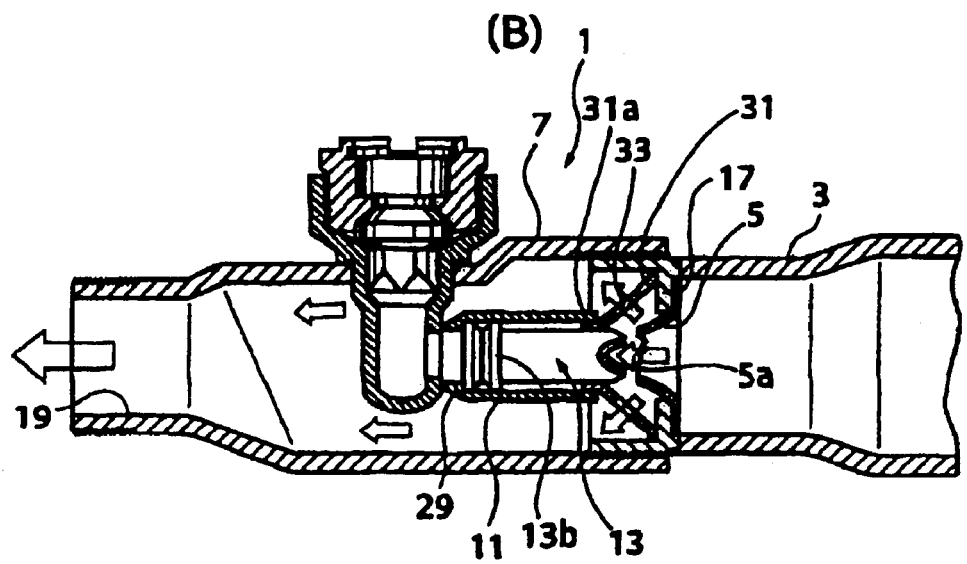
Figure 5:
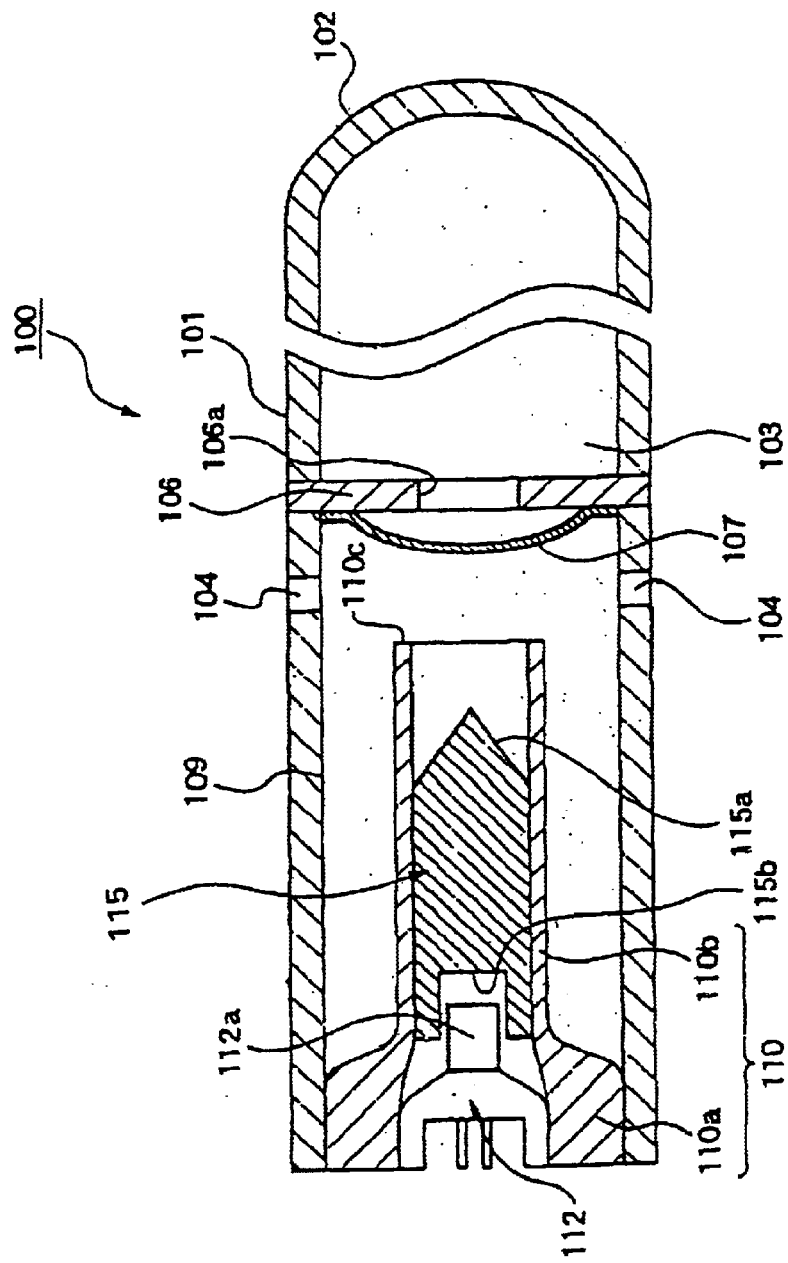
FIG. 5 is a schematic longitudinal-sectional view of a known stored-gas-type inflator disclosed in, for example, Japanese Unexamined Patent Application No. 10-250525.
Figure 6:
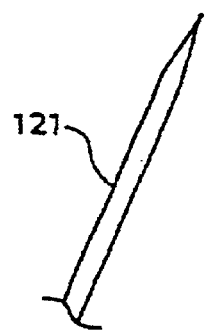
FIGS. 6(A)–6(C) are illustrations of other examples of tips of the piston.
Figure 6:
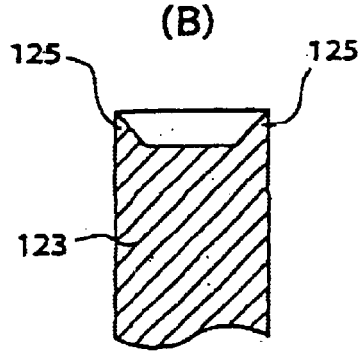
Figure 6:
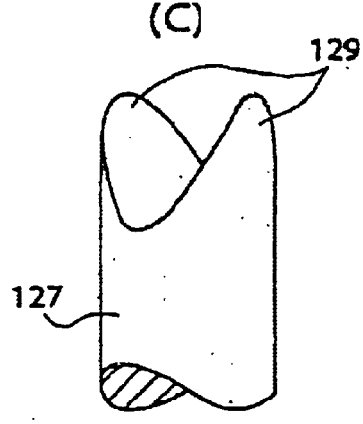
Figure 7:
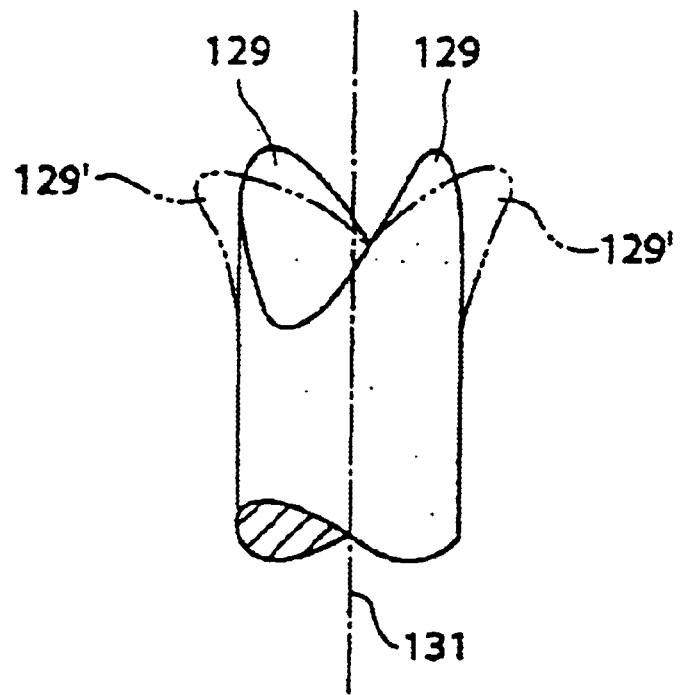
FIG. 7 is a schematic view of a two-forked punch-shaped piston being deformed at an instant when the piston comes into contact with a burst disk.

The operation of the inflator is described below with reference to FIG. 4 which includes illustrations showing the operation of the inflator shown in FIG. 1. FIG. 4(A) shows the movement of the piston. FIG. 4(B) shows the inflator when the high-pressure gas is ejected.

When an impact is applied to the automobile (or another action occurs that triggers the requirement for deployment of the airbag), the ignition plug 23 of the inflator 1 starts to operate. The ignition plug 23 ignites the initiator 9. A blast is applied by the initiator 9 to the space 25 disposed at the lower part of the housing 21. The blast goes into the barrel 11 through the through-hole 27 disposed at the lower part of the housing, and forces the piston 13 toward the bottle 3 along the axis of the barrel 11. Then, the cutting edges 35 of the piston 13 cut into the sealing plate 5 and break the same at a portion thereof corresponding to the tip of the piston 13. The piston 13 is pushed out toward the bottle 3 until the larger diameter part 13b of the piston 13 anchors at the end 31a of the supporting plate 31 (see FIG. 4(A)). Since the larger diameter part 13b of the piston 13 has a given length, the piston 13 moves stably in the barrel 11 along the axis thereof.

Since the angle θ of each tapered face of the head 13a of the piston 13 is set as described above, the tips of the cutting edges 35 do not slip on the surface of the sealing plate 5 when breaking the sealing plate. The cutting edges 35 cut into the sealing plate 5 such that they pierce into the sealing plate 5. Therefore, the cutting edges 35 do not bend toward the outside and can reliably break the sealing plate 5.

When the sealing plate 5 is broken, the piston 13 is pushed to the left by the pressure of the high-pressure gas stored in the bottle 3 back to the position where the larger diameter part 13b of the piston 13 is anchored at the step 29 disposed inside the barrel 11, as shown in FIG. 4(B). The high-pressure gas which has been stored in the bottle 3 flows into a space between the flange 17 and the supporting plate 31 through a part 5a of the sealing plate 5 at which the sealing plate 5 was broken. Gas travels into the diffuser 7 through the through-holes 33 of the supporting plate 31, and is discharged through the gas outlet 19.

As described above, according to the present invention, an inflator capable of breaking a sealing plate (burst disk) reliably and efficiently with each cutting edge of a piston including a tapered face can be provided.

The priority application, Japanese Patent Application No. 2001-160257, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflator comprising:

a bottle provided with an opening, to be charged with a high-pressure gas;

a sealing plate for sealing the bottle at the opening thereof;

an initiator for generating a gas blast as a motive force to break the sealing plate; and a piston including a cutting edge for breaking the sealing plate, the piston accelerating with the gas blast of the initiator, wherein the sealing plate swells toward the piston due to the pressure of the high-pressure gas;

wherein the cutting edge of the piston comes into contact with a portion of the sealing plate offset from the vertex of the swell of the sealing plate; and wherein the cutting edge is provided with a tapered face formed at the side away from the vertex of the sealing plate side of the cutting edge;

wherein the piston is arranged so that an angle between the tapered face and a line disposed on a longitudinal axis of the piston is less an acute angle between a line normal to the sealing plate at a contact point between the cutting edge and the sealing plate and the line disposed on the longitudinal axis of the piston.

2. An inflator according to claim 1, wherein the tapered face is formed so that an angle between the tapered face and the line normal to the sealing point at the point where the cutting edge contacts the sealing plate is smaller than an angle α of friction determined in accordance with the materials of the piston and the sealing plate.

3. An inflator according to one of claim 1, wherein the length in the axial direction of the piston of the tapered face is greater than or equal to 0.5 mm.

4. The inflator of claim 1, wherein the tapered face is arranged so that an angle between the tapered face and the line formal to the sealing plate at a contact point between the cutting edge and the sealing plate is greater than zero and less than an angle of friction determined based on sealing plate and the piston.

5. An inflator comprising:

a bottle containing pressurized gas;

a sealing plate for sealing an opening in the bottle; and a piston for breaking the sealing plate;

wherein the piston includes a cutting edge having a tapered face formed on an outer side of the cutting edge away from the center of the sealing plate;

wherein the piston is arranged so that an angle between the tapered face and a line disposed on a longitudinal axis of the piston is less an acute angle between a line normal to the sealing plate at a contact point between the cutting edge and the sealing plate and the line disposed on the longitudinal axis of the piston.

6. The inflator of claim 5, wherein the tapered face is formed so that an angle between the tapered face and the line normal to the sealing point at the point where the cutting edge contacts the sealing plate is smaller than an angle α of friction determined based on the materials of the piston and the sealing plate.

7. The inflator of claim 6, wherein the length of the tapered face in the axial direction of the piston is greater than or equal to 0.5 mm.

8. The inflator of claim 5, wherein the angle between the tapered face and the line normal to the sealing point at the point where the cutting edge contacts the sealing plate is smaller than or equal to an angle between an elongation of the tapered face and a line disposed along a peripheral surface of the piston parallel to the longitudinal axis of the piston.

9. A stored gas inflator having a sealing plate and a punch for puncturing the sealing plate and releasing the gas, wherein the punch is forked shaped and includes two prongs, each of the prongs having a surface tapering inward from the outside of the punch; wherein each of the prongs is arranged so that an angle between the tapered surface and a line disposed on a longitudinal axis of the punch is less an acute angle between a line normal to the sealing plate at a contact point between a cutting edge of the tapered surface and the sealing plate and the line disposed on the longitudinal axis of the punch.

10. The inflator of claim 9, wherein the tapered surface is arranged so that an angle between the tapered surface and a line formal to the sealing plate at a contact point between a cutting edge of the tapered surface and the sealing plate is greater than zero and less than an angle of friction determined based on sealing plate and the punch.

* * * * *